Figure 1:
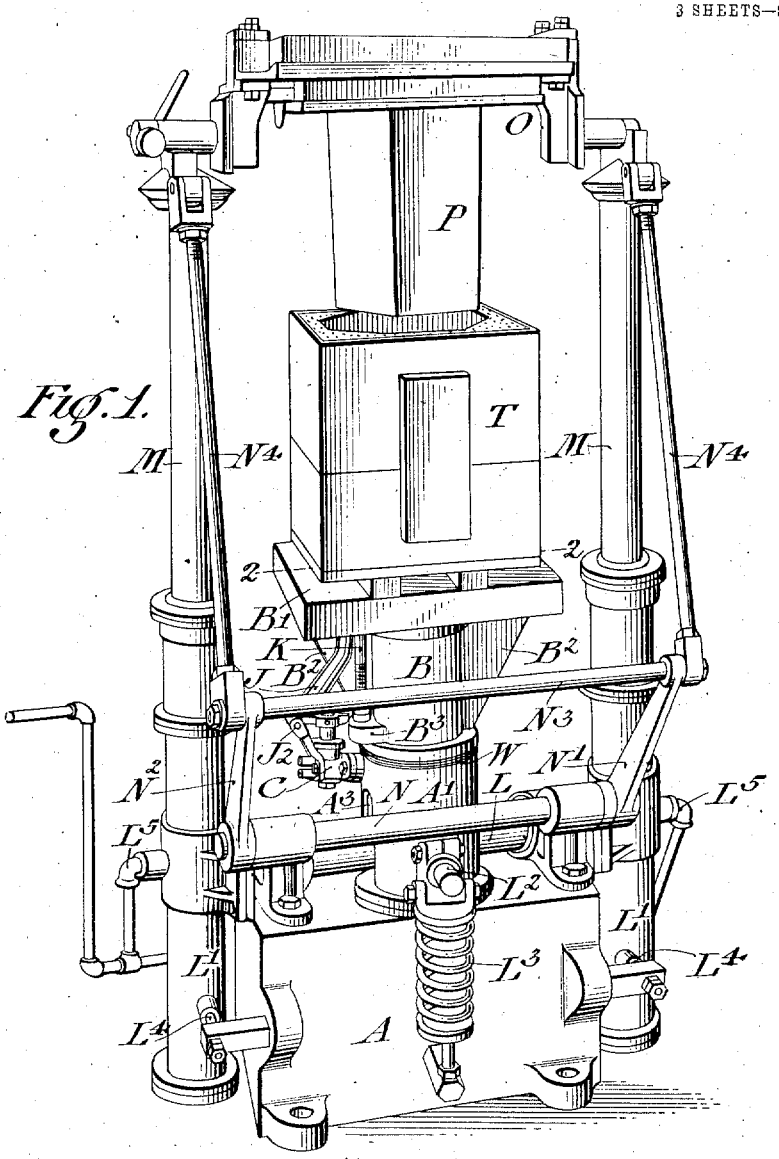

W. LEWIS.

JARRING MACHINE.

APPLICATION FILED JULY 1, 1909.

Reissued Aug. 17, 1909.

13,012.

3 SHEETS—SHEET 1.

WITNESSES.

Stewart

D. S. William

INVENTOR

Wilfred Lewis

BY

Francis J. Chandler his ATTORNEY

W. LEWIS.
JARRING MACHINE.
APPLICATION FILED JULY 1, 1909.
Reissued Aug. 17, 1909.
13,012.
3 SHEETS—SHEET 2.
Fig. 3.
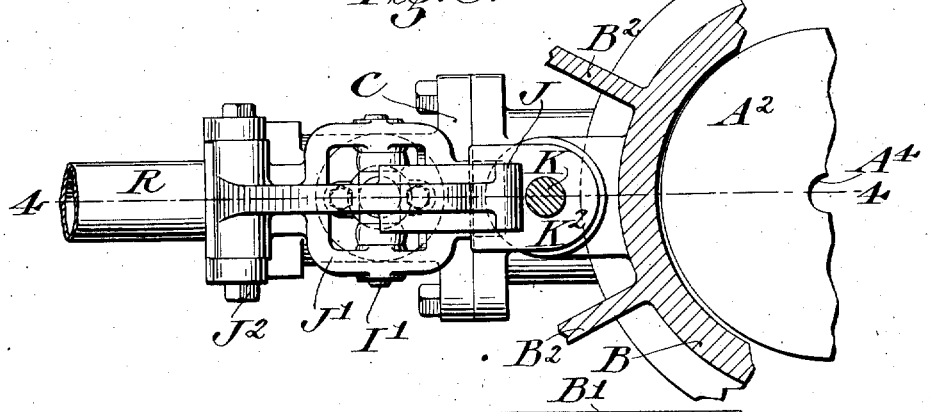
Fig. 4.
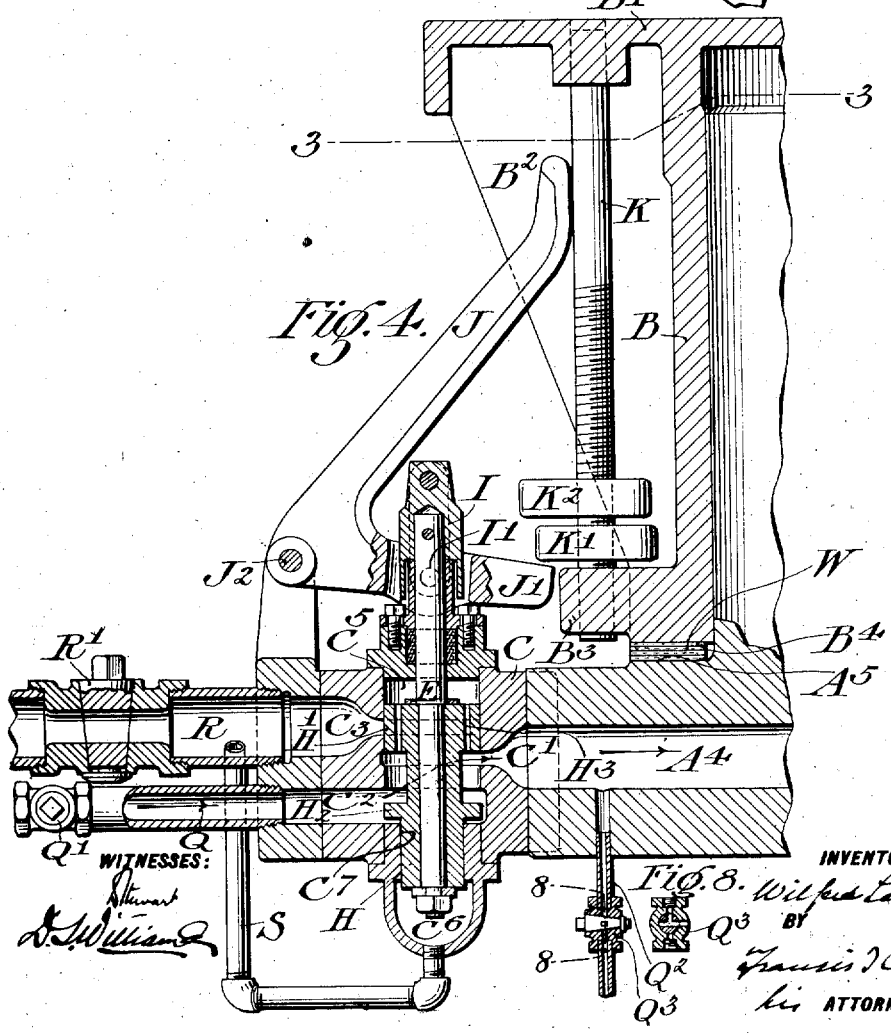
Fig. 8.
WITNESSES:
J. Stewart
D. S. Williams
INVENTOR
Wilfred Lewis
BY
Francis J. Chandler
his ATTORNEY.

W. LEWIS.

JARRING MACHINE.

APPLICATION FILED JULY 1, 1909.

Reissued Aug. 17, 1909.

13,012.

3 SHEETS—SHEET 3.

WITNESSES:

INVENTOR

BY

ATTORNEY.

UNITED STATES PATENT OFFICE.

WILFRED LEWIS, OF PHILADELPHIA, PENNSYLVANIA, ASSIGNOR TO TABOR MANUFACTURING COMPANY, OF CAMDEN, NEW JERSEY, A CORPORATION OF NEW JERSEY.

JARRING-MACHINE.

No. 13,012. Specification of Reissued Letters Patent. Reissued Aug. 17, 1909.

Original No. 891,488, dated June 23, 1908, Serial No. 327,631. Application for reissue filed July 1, 1909. Serial No. 505,526.

*To all whom it may concern:*

Be it known that I, WILFRED LEWIS, a citizen of the United States of America, residing in the city and county of Philadelphia, in the State of Pennsylvania, have invented a certain new and useful Improvement in Jarring-Machines, of which the following is a true and exact description, reference being had to the accompanying drawings, which form a part thereof.

My invention relates to molding machines of the type known as jarring machines and has for its object to generally improve the strength and simplicity of such machines and also to provide, both for their more efficient automatic action and for their properly guided and controlled action in the drawing of the pattern.

The nature of my improvements will be best understood as described in connection with the drawings in which they are illustrated and in which—

Figure 2:
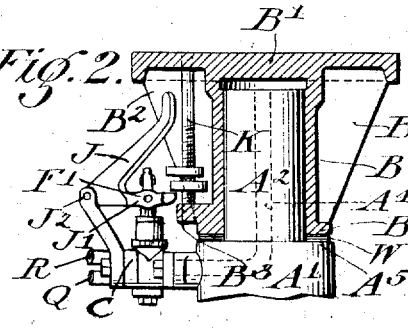
Figure 5:
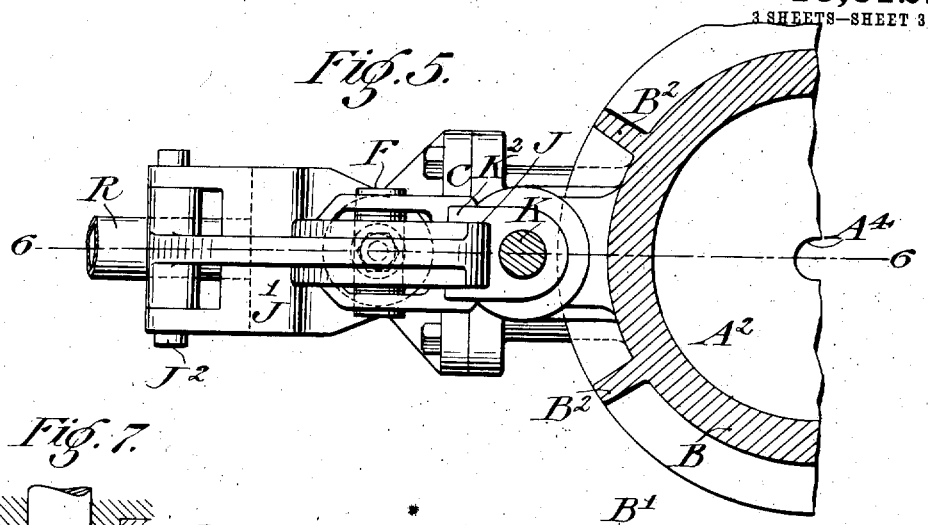
Figure 7:
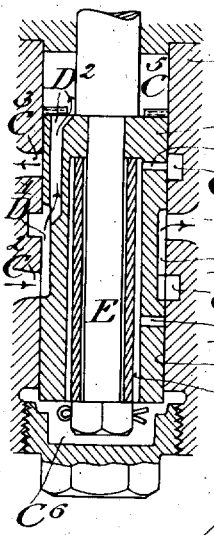
Figure 6:
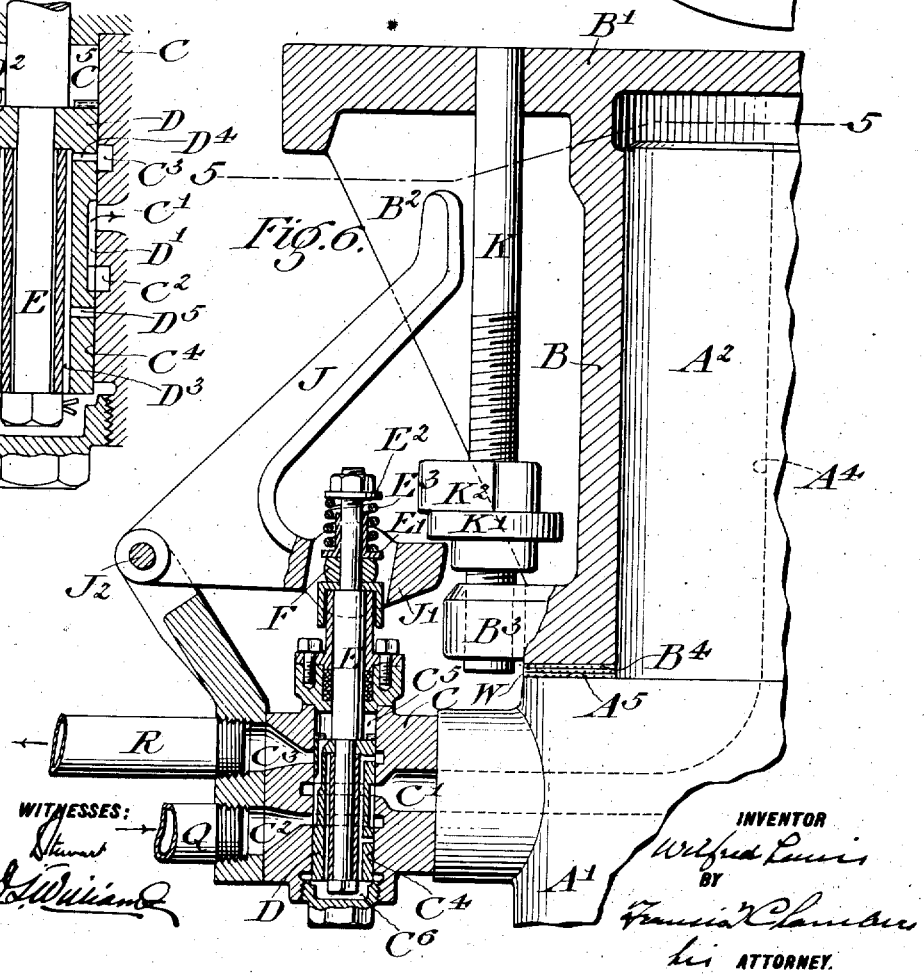

Figure 1 is a perspective elevation of a machine provided with my improvements. Fig. 2 is an elevation of the cylinder and piston of my machine, with the cylinder and jarring table shown in section, and the valve actuating mechanism illustrated in connection therewith. Fig 3 is a plan view on the section line 3—3 of Fig. 4. Fig. 4 is an elevation on the line 4—4 of Fig. 3, the mechanism being shown in Figs. 3 and 4 on a larger scale than in Figs. 1 and 2. Fig. 5 is a plan view on the section line 5—5 of Fig. 6, of a somewhat modified construction. Fig. 6 is an elevation on the section line 6—6, of Fig. 5. Fig. 7 is a longitudinal central sectional view of the valve construction shown in Figs. 5 and 6, and Fig. 8 is a section on the line 8—8 of Fig. 4.

A, is the base of the machine which supports the pedestal A′, having the anvil face $A^5$, from the center of which pedestal extends upward the fixed plunger piston $A^2$; the lower part of the pedestal A′, is provided with a transverse opening, indicated at $A^3$, and a port $A^4$, extends in laterally through the upper end of the pedestal and through the piston to the head thereof.

B, is a movable cylinder fitting on the stationary piston $A^2$, and supporting and, preferably, formed integral with the jarring table B′, the outwardly extending flanges of which are buttressed and stiffened by the supporting ribs or buttresses indicated at $B^2$, $B^2$, etc.

$B^3$, is a perforated and internally threaded lug extending out from the lower end of the cylinder B, the lower end $B^4$, of which contacts with the anvil $A^5$. By preference the anvil $A^5$ has its cylindrical engaging surface faced by the washer W for the purpose hereinafter described.

The stationary piston and movable table supporting cylinder forms one important feature of my invention, this construction materially aiding in the stiffness and strength of the structure and also being an important feature in the valve actuating combination of mechanism to be described.

C, is a valve casing shown in two different modifications one in Fig. 4 and the other in Figs. 6 and 7. Both, however, are characterized by having a cylindrical valve chamber which communicates, through a port C′, with the port $A^4$, leading to the top of the stationary piston, through a port $C^2$, with a pressure fluid supply pipe Q, and through a port $C^3$, which communicates with an exhaust conduit, such as R. The cylindrical chamber has at each end the terminal chambers $C^5$, $C^6$. The chamber $C^6$, in the construction of Fig. 4, communicates with the exhaust pipe R, through a conduit S, while, in the construction of Figs. 6 and 7, corresponding chamber $C^6$, is closed.

D, see Figs. 6 and 7, is a piston valve working in the casing C, and formed with an annular port D′, communicating through an internal port or passage $D^2$, with the head of the piston valve and through it with the chamber $C^5$; a vertical interior port or passage $D^3$, communicates with the chamber $C^6$, and with the lateral port $D^4$, which is so placed as to register with the exhaust port $C^3$, when the port D′, connects the admission port $C^2$, with the port C′, as shown in Fig. 7. A lateral port $D^5$, also connects with the port $D^3$, and is so located that when the valve is moved upward it will communicate with the port $C^2$. It will be observed that, in the position shown in Figs. 6 and 7, the port C′, is connected with the inlet port $C^2$, admitting the pressure fluid to the cylinder and also through the port $D^2$, to the chamber $C^5$, so that the pressure of the air or steam rests upon the head of the piston valve D. When the valve is raised through its valve rod E, the port D′, is cut off from the admission port $C^2$, and immediately thereafter connects the port C′, with the exhaust port $C^3$, the chamber $C^5$, being of course, simultaneously connected with the exhaust port. The upward movement of the piston valve also disconnects the ports $D^4$, and $D^3$, with the exhaust port and immediately thereafter the lateral port $D^5$, connects with the supply port $C^2$, admitting the pressure fluid to the chamber $C^6$. It will thus be seen that immediately on the valve being raised to an intermediate position by means acting through the stem E, pressure fluid is admitted below it to complete its upward movement, by a quick and rapid action. It will also be seen that when the valve is in elevated position its downward movement through action on its stem E, will reverse the conditions described, connecting the chamber $C^6$, with the exhaust and the chamber $C^5$, with the pressure fluid port, so that, after passing the intermediate position, the further downward movement of the valve will become rapid under the influence of the pressure fluid.

In the modified construction of valve shown in Fig. 4, the lower section of the cylindrical valve chamber, indicated at $C^7$, is of a smaller diameter than the upper sections and the piston valve is properly formed to fit in both the broader and narrower sections as shown. The valve is indicated at H, and has an upper cylindrical section H′, with one or more vertical ports $H^3$, formed through it connecting with the chamber $C^5$, an annular flange $H^2$, being formed on the lower section of the valve as shown. In the position shown in Fig. 4 the supply port $C^2$, is in free communication with the port $A^4$, and with the chamber $C^5$, and it will be seen that an upward movement of the valve will, simultaneously with the connection of the ports $A^4$, and exhaust port $C^3$, close the admission port $C^2$, and connect the chamber $C^5$, with the exhaust, while the pressure fluid, acting on the annular section $H^2$, will press the valve upward to its higher position. It will be seen also that, in the downward motion of the valve the pressure fluid will be admitted to the chamber $C^5$, simultaneously with the opening of the ports $C^2$, and $A^4$, resulting in the utilization of the pressure fluid to complete the downward motion of the valve. So far as the action of the valve is concerned in this construction, the chamber $C^6$, might be absent or open to the atmosphere. I employ it, however, by preference, and connect it by the pipe S, with the exhaust conduit R, which is normally, of course, at atmospheric pressure, but which, for purposes to be described, I provide with a stop cock R′, by which it can be entirely closed and, in connection with this modification, I employ a separate pressure fluid admission pipe $Q^2$, leading directly to the port $A^4$, and provided with a three-way cock $Q^3$, Fig. 8. When it is desired to use the cylinder and piston for the work of drawing the pattern, I close the cock R′, in the exhaust pipe and the cock Q′, in the supply pipe and admit pressure fluid to the port $A^4$, through the pipe $Q^2$. The upward movement of the cylinder, through mechanism to be described, will draw the piston valve upward, connecting the port $A^4$, with the exhaust, but the exhaust being closed, the pressure fluid can not escape, but will pass through the pipe S, into the chamber $C^6$, with the result of keeping a constant pressure on the lower end of the piston valve and holding it in its uppermost position, a function of some importance, in that this position of the valve insures that the valve actuating lever shall not get into the way of the actuating mechanism, which might be the case if this precaution were not taken.

As already stated the initial movements of the piston valves D or H are imparted to them through the valve stems indicated at E. In the construction of Fig. 4, a cap I, is secured at the top of the valve stem E, and provided with laterally extending trunnions I′, by which it is connected to the lever arm J′, of a bell crank lever pivoted at $J^2$, and provided with the second lever arm indicated at J. The construction indicated in Fig 6 is much the same except in detail, the connection of the spindle E with the bell crank lever being made in this construction through a trunnion sleeve F, held normally in its lowermost position by the action of a spring $E^3$, which as shown is coiled around a sleeved collar E′, which rests on the sleeve F, the upper end of the spring resting against an abutment plate $E^2$. In this construction a certain elasticity is provided for in the upward movement of the valve.

In both modifications the bell crank lever J, J′, and through it, the piston valves, are actuated by adjustable blocks K′, $K^2$, attached to the vertically movable cylinder B, and, preferably, as shown, through a threaded rod K, the upper end of which is held by the table B′, while its lower end is secured in the lug $B^3$, the blocks K′, and $K^2$, screwing on this rod, as indicated. It will be seen that in the upward movement of the table the block $K^2$, will come in contact with the lever arm J, pushing it upward and outward and raising the piston valve to such an extent as to bring the air pressure into play to complete its upward movement, so also it will be seen that during the downward movement of the piston the block K′, will come in contact with the lever arm J′, pushing it downward and moving the piston valve through the initial part of its downward motion.

It will be seen that the valve mechanism here shown and described insures full port openings during the rise and fall of the jarring head and reduces to a minimum the cushioning effect of back pressure when the head strikes its abutment in falling. At the instant of contact the port $C^2$, may just begin to open and practically the full effect of the fall can be realized on the sand, but as the valve continues to open, the head rises at full speed with a full port opening until admission is cut off and the head again drops with a full exhaust. In jar ramming, the work done upon the sand depends first upon the arrested velocity and second upon the intensity of the blow struck. The greater the fall the greater the work done, and the harder the materials coming in contact the greater the intensity of the shock. It is important to settle the sand rapidly but not always advisable to ram it very hard, and to obtain quick action with limited intensity of effect, I introduce between the anvil face $A^5$, and the cylinder end $B^4$, the fiber washer W, which is preferably built up of alternate rings of leather, rawhide, or the like and steel, the leather or rawhide being used to deaden the blow and the steel simply to hold the softer rings in place. The intensity of the shock naturally varies directly with the fall and inversely with the thickness of fiber interposed between the anvil and the jarring head. Metallic contact is thus avoided and the blow softened to any desired extent.

The remaining portions of the apparatus shown in Fig. 1 of the drawings embody some features of novelty which are claimed in my copending application filed December 1, 1906, Serial Number 345,947, patented June 23rd, 1908, No. 891,489, but they form no essential parts of my present invention. It will be enough therefore to very briefly refer to these parts of the machine; through the transverse slot $A^3$ in the pedestal A′ passes a rock shaft L, having a laterally extending pin $L^2$, which extends through a slot in the side of the pedestal A′, and to which is attached spring $L^3$, tending to draw the shaft into the position in which the cylinders L′, L′, secured to the two ends of the rock shaft L, are vertical; stops as indicated at $L^4$, $L^4$, preventing the cylinders from moving beyond this vertical position under the influence of the spring. $L^5$, $L^5$, indicate compressed air conduits leading to the cylinders L′, L′ and M, M, indicate plunger pistons working in the cylinders L′, L′, the proper alinement of the cylinders and plunger pistons being provided for as shown by the rock shaft N having the lever arms $N^1$, $N^2$, connecting with a rod $N^3$, to the ends of which are pivotally connected the rods $N^4$, $N^4$, the upper ends of which are pivotally connected to the upper ends of the plunger pistons M, M, the device constituting a parallel motion of a familiar kind. O, indicates the pattern plate secured to the top of the plunger pistons M, M; P, indicating the pattern, and T, the mold box.

I regard the arrangement shown in which the movable jar table is carried by the cylinder as highly advantageous. By this arrangement the metal of the movable member is distributed in the most advantageous manner to resist the severe stresses acting on it in operation. The table and cylinder form in effect a deep and stiff beam in which all of the parts of the striking structure are put under compression and not under tension at the instant of engaging the anvil. Furthermore the extended bearing surface obtained by arranging to have the end of the cylinder impinge against the anvil assists in preserving the alinement and in reducing the injurious wear occurring in operation.

Having now described my invention, what I claim as new and desire to secure by Letters Patent is,

1. In a jar molding machine, a fixed vertical piston in combination with a movable cylinder fitting on said piston and supporting a mold table and an anvil against which the lower end of the movable cylinder impinges.

2. In a jar molding machine, the combination of a base member having a vertical piston projecting from its upper side and an anvil surface at the side of said piston, and a movable cylinder fitting on said piston and supporting a mold table at its top, said cylinder having integral lateral flanges extending from its sides to support the lateral extensions of the table, said machine having provisions whereby a fluid under pressure may be admitted to and exhausted from the space in said cylinder above the piston in order to raise the lower end of the cylinder off of said anvil surface and to allow it to drop back against said surface.

3. In a jarring machine, a fixed vertical piston having a port extending through it to its top in combination with a movable cylinder fitting on said piston and supporting a mold table, and an anvil against which the lower end of the movable cylinder impinges.

4. In a jarring machine, a fixed vertical piston having a port extending through it to its top in combination with a movable cylinder fitting on said piston and supporting a mold table at its top, said cylinder having lateral flanges extending from its sides to support the lateral extensions of the table, and an anvil against which the lower end of the movable cylinder impinges.

5. In a jarring machine, means for actuating a mold table consisting of a cylinder and piston in combination with a valve chamber having ports connected to a source of fluid pressure, to exhaust and to the cylinder, a piston valve moving in said chamber, the ports of the chamber and valve being arranged so that on being moved into an intermediate position to close the cylinder port either to pressure or exhaust, the pressure acts upon the valve to complete its movement and thus connect the cylinder port to exhaust or pressure, and means for moving the valve from either limit of its movement into its intermediate position.

6. In a jarring machine, means for actuating a mold table consisting of a cylinder and piston in combination with a valve chamber, having ports connected to a source of fluid pressure, to exhaust and to the cylinder, a piston valve moving in said chamber, the ports of the chamber and valve being arranged so that on being moved into an intermediate position to close the cylinder port either to pressure or exhaust, the pressure acts upon the valve to complete its movement and thus connect the cylinder port to exhaust or pressure, and means actuated by the movement of the part which moves the mold table for moving the valve from either limit of its movement into its intermediate position.

7. In a jarring machine, a fixed vertical piston having a port extending through it to its top in combination with a movable cylinder fitting on said piston and supporting a mold table, a valve chamber, having ports connected to a source of fluid pressure, to exhaust and to the cylinder, a piston valve moving in said chamber, the ports of the chamber and valve being arranged so that on being moved to close the cylinder port either to pressure or exhaust the pressure acts upon the valve to complete its movement and thus connect the cylinder port to exhaust or pressure, stops secured to and moving with the cylinder and valve actuating levers arranged to be engaged by said stops as described.

8. In a jarring machine, means for actuating a mold table consisting of a cylinder and piston, in combination with a valve chamber having ports connected to a source of fluid pressure, to exhaust, and to the cylinder, said chamber having also chambers at top and bottom, a piston valve moving in said chamber, the ports of the cylinder and valve being arranged so that the pressure fluid acts to move the valve over the later stages of its travel in either direction, a cock for closing the exhaust, an open conduit connecting the exhaust with the end chamber in the valve chamber, a conduit for admitting pressure fluid to the cylinder without passing through the valve, and means actuated by the movements of the part which moves the table and acting to move the valve to and over its intermediate positions.

WILFRED LEWIS.

Witnesses:
ARNOLD KATZ,
D. STEWART.